US012789824B2

(12) United States Patent
Heller

(10) Patent No.: US 12,789,824 B2
(45) Date of Patent: Nov. 10, 2026

(54) SYSTEM AND METHOD FOR TESTING A DRIVING ASSISTANCE SYSTEM

(71) Applicant: Bayerische Motoren Werke Aktiengesellschaft, Munich (DE)

(72) Inventor: Martin Heller, Graben (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 181 days.

(21) Appl. No.: 18/728,426

(22) PCT Filed: Jan. 26, 2023

(86) PCT No.: PCT/EP2023/051847
§ 371 (c)(1),
(2) Date: Jul. 11, 2024

(87) PCT Pub. No.: WO2023/148068
PCT Pub. Date: Aug. 10, 2023

(65) Prior Publication Data
US 2025/0108816 A1 Apr. 3, 2025

(30) Foreign Application Priority Data
Feb. 2, 2022 (DE) ..................... 10 2022 102 374.5

(51) Int. Cl.
*B60W 50/04* (2006.01)
*B60K 35/10* (2024.01)
(Continued)

(52) U.S. Cl.
CPC ............. *B60W 50/04* (2013.01); *B60K 35/10* (2024.01); *B60K 35/26* (2024.01); *B60K 35/29* (2024.01);
(Continued)

(58) Field of Classification Search
CPC ........ B60K 2360/143; B60K 2360/199; B60K 35/10; B60K 35/25; B60K 35/26;
(Continued)

(56) References Cited

U.S. PATENT DOCUMENTS

| | | | |
|---|---|---|---|
| 8,803,670 | B2 | 8/2014 | Steckel et al. |
| 2008/0211779 | A1 | 9/2008 | Pryor |
| 2018/0232195 | A1 | 8/2018 | Jaegal et al. |

FOREIGN PATENT DOCUMENTS

| | | | | |
|---|---|---|---|---|
| DE | 10 2008 046 102 A1 | 3/2010 | | |
| DE | 10 2014 224 892 A1 | 6/2016 | | |
| DE | 102017220466 B3 * | 1/2019 | ............. | H04R 29/00 |

OTHER PUBLICATIONS

International Search Report (PCT/ISA/210) issued in PCT Application No. PCT/EP2023/051847 dated Jun. 19, 2023 (2 pages).

(Continued)

*Primary Examiner* — Charles J Han
(74) *Attorney, Agent, or Firm* — Crowell & Moring LLP

(57) ABSTRACT

A system for testing a driving assistance system includes a sensor arrangement configured to detect an actuation of an operating element by a user and to generate corresponding first detection data. The sensor arrangement is also configured to detect an acoustic signal indicating the actuation of the operating element and to generate corresponding second detection data. The system includes at least one evaluation module configured to determine, based on the first detection data, a first point in time corresponding to the actuation and to determine, based on the second detection data, a second point in time corresponding to an output of the acoustic signal.

9 Claims, 3 Drawing Sheets

(51) Int. Cl.
*B60K 35/26* (2024.01)
*B60K 35/29* (2024.01)
*B60W 50/08* (2020.01)
*B62D 15/02* (2006.01)

(52) U.S. Cl.
CPC ....... *B60W 50/08* (2013.01); *B60K 2360/143* (2024.01); *B60K 2360/199* (2024.01); *B62D 15/027* (2013.01)

(58) Field of Classification Search
CPC ....... B60K 35/29; B60W 50/04; B60W 50/08; B62D 15/027
See application file for complete search history.

(56) References Cited

OTHER PUBLICATIONS

German-language German Search Report issued in German Application No. 10 2022 374.5 dated Jun. 23, 2023 with partial English translation (7 pages).

* cited by examiner

SYSTEM AND METHOD FOR TESTING A DRIVING ASSISTANCE SYSTEM

CROSS REFERENCE TO RELATED APPLICATION

This application is a 371 of International Application No. PCT/EP2023/051847, filed Jan. 26, 2023 which claims priority under 35 U.S.C. § 119 from German Patent Application No. 10 2022 102 374.5, filed Feb. 2, 2022, the entire disclosure of which is herein expressly incorporated by reference.

BACKGROUND AND SUMMARY

The present disclosure relates to a system for testing a driving assistance system, to a method for testing a driving assistance system, and to a storage medium for carrying out the method. The present disclosure relates in particular to homologation of a parking aid.

The development of driving assistance functions is constantly growing in importance. In order to allow driving assistance systems to perceive their surroundings as precisely as possible, use can be made of sensor measurements from various sensor types, such as, e.g., cameras, LiDAR and radars. For reliable functioning of driving assistance functions, precise perception of the surroundings has to be ensured in this case.

A major challenge in the development of driving assistance functions is that the driving assistance functions have to go through stringent testing in order to meet safety regulations and to win the trust of users. For example, in the case of a parking aid, it is required that a period of time between an activation of the parking aid by a user and the output of acoustic signals by the parking aid must not exceed a stipulated threshold value. For determining the period of time between the activation of the parking aid and the output of the acoustic signals, use can be made of bus signals of the vehicle electronics. This is associated with substantial expenditure, however. In addition, granting third parties access to the vehicle electronics can be problematic.

It is an object of the present disclosure to specify a system for testing a driving assistance system, a method for testing a driving assistance system, and a storage medium for carrying out the method, which allow simplified verification of a driving assistance system, in particular of a parking aid.

According to one independent aspect of the present disclosure, a system for testing a driving assistance system is specified. The system comprises a sensor arrangement and at least one evaluation module. The sensor arrangement is configured to detect an actuation of an operating element of a vehicle by a user and to generate corresponding first detection data; and to detect an acoustic signal which indicates the actuation of the operating element by the user or which is output on the basis of the actuation of the operating element and to generate corresponding second detection data. The at least one evaluation module is configured to determine, on the basis of the first detection data, a first point in time which corresponds to the actuation of the operating element by the user; and to determine, on the basis of the second detection data, a second point in time which corresponds to an output of the acoustic signal.

According to the invention, the sensor arrangement, which is able to be installed in the vehicle, detects two events: firstly, the actuation of the operating element (e.g. a haptic and/or acoustic trigger on the gear selector switch or an activation element for the driving assistance system) and secondly, an acoustic signal triggered thereby (e.g. an audio output of a loudspeaker), wherein a timestamp is determined for each of the events. The corresponding timestamps can be used to determine whether, e.g., legally stipulated maximum times between actuation of the operating element and the acoustic signal are met. As a result, it is possible to draw conclusions about performance of the driving assistance system, such as a parking aid, for example for homologation thereof. In addition, for the homologation, it is not necessary to pick up discrete cabling or bus signals and/or to use proprietary information, such as, e.g., circuit diagrams and/or on-board electrical system topologies.

Preferably, the at least one evaluation module is configured to determine a difference between the second point in time and the first point in time. The difference indicates a period of time between the actuation of the operating element and the thus initiated output of the acoustic signal. For example, it may be legally stipulated that the period of time between the actuation of the operating element and the thus initiated output of the acoustic signal must be equal to or less than a threshold value. The system according to the invention can be used to perform a corresponding check in a revision-proof manner.

Preferably, the threshold value is 1 second or less, 800 milliseconds or less, or 600 milliseconds or less. In some embodiments, the threshold value can be 600 milliseconds.

Preferably, the at least one evaluation module is configured to determine the difference between the second point in time and the first point in time and to compare it with the threshold value. A comparison result can, for example, be output on a display of the system and/or be transmitted to an external unit, such as a server or a backend.

Preferably, the detection data are only evaluated when the acoustic signal is detected, in particular when the acoustic signal is detected with a specific certainty (e.g. when the second detection data or a corresponding (voltage) signal exceeds a minimum amplitude). In other words, the acoustic signal can be used as a trigger which initiates the evaluation of the first detection data and of the second detection data.

Preferably, the at least one evaluation module comprises, or is, at least one processor module. A processor or a processor module is a programmable arithmetic and logic unit, that is to say a machine or an electronic circuit, which takes transferred commands as a basis for controlling other elements and thereby advances an algorithm (process).

Preferably, the at least one evaluation module comprises, or is, an oscilloscope.

Preferably, the sensor arrangement comprises at least one first sensor module which is configured to detect the actuation of the operating element by the user and to generate the first detection data. The at least one first sensor module can comprise one or more electronic touch sensors which output a corresponding signal when touched by the user. However, the present disclosure is not limited thereto and the at least one first sensor module can comprise one or more microphones which are configured to acoustically detect the actuation of the operating element by the user (e.g. by a characteristic noise when a gear selector switch is actuated).

In some embodiments, the sensor arrangement, in particular the at least one first sensor module, can be configured to detect the actuation of the operating element by the user and to generate the first detection data when the touch exceeds a threshold, such as, for example, a force and/or pressure threshold. This makes it possible to prevent a situation in which an actuation of the operating element is falsely detected for example on the basis of a light touch of the user without corresponding activation of the driving assistance system.

Preferably, the sensor arrangement comprises at least one second sensor module which is configured to detect the acoustic signal which indicates the actuation of the operating element by the user and to generate the second detection data. The at least one second sensor module can comprise one or more microphones which can detect a characteristic acoustic signal which is output during and/or after an activation of the driving assistance system.

Preferably, the at least one first sensor module and the at least one second sensor module are of a different function type. For example, the at least one first sensor module can comprise one or more electronic touch sensors, and the at least one second sensor module can comprise one or more microphones, in particular directional microphones.

Preferably, the at least one first sensor module is able to be attached, in particular able to be detachably attached, to the operating element of the vehicle. For example, the at least one first sensor module can be detachably attached to the operating element by means of one or more first mounting elements. The one or more first mounting elements can be chosen from the group which comprises, or consists of, an adhesive element (e.g. an adhesive layer or an adhesive tape), a screw, a clamping element, and combinations thereof.

In addition or alternatively, the at least one second sensor module can be able to be attached, in particular able to be detachably attached, to a structure of the vehicle. For example, the at least one second sensor module can be detachably attached to the structure of the vehicle by means of one or more second mounting elements. The one or more second mounting elements can be chosen from the group which comprises, or consists of, an adhesive element (e.g. an adhesive layer or an adhesive tape), a screw, a clamping element, and combinations thereof.

In some embodiments, the at least one second sensor module can be able to be attached, in particular able to be detachably attached, to a structure of the vehicle such that the at least one second sensor module is arranged on or near a loudspeaker of the vehicle, which loudspeaker outputs the acoustic signal which is to be detected.

Preferably, the sensor arrangement comprises a sensor module which is configured to detect both the actuation of the operating element by the user and the acoustic signal and to generate the first detection data and the second detection data. For example, a single sensor module can be provided to detect both events. In some embodiments, the sensor module can comprise a microphone or be a microphone.

Preferably, the system comprises a sound generator which is able to be attached to the operating element of the vehicle, wherein the sound generator is configured to generate sound when the operating element is actuated by the user, which sound is able to be detected by the sensor module, in order to generate the first detection data. For example, the sound generator can be detachably attached to the operating element of the vehicle by means of one or more mounting elements. The one or more mounting elements can be chosen from the group which comprises, or consists of, an adhesive element (e.g. an adhesive layer or an adhesive tape), a screw, a clamping element, and combinations thereof.

Preferably, the sound generator is a mechanical sound generator, such as, for example, a mechanical click-sound generator.

Preferably, the operating element of the vehicle is a gear selector switch or a switching element (e.g. a mechanical button) for activating the driving assistance system or a corresponding driving assistance function, such as a parking aid.

Preferably, the system is able to be installed in the vehicle in a non-permanent manner. In other words, the system is not permanently integrated in the vehicle and can be installed in the vehicle only temporarily or in a time-limited manner for the purpose of testing or homologating the driving assistance system.

Preferably, the driving assistance system is a parking aid (Park Distance Control, PDC). The parking aid can, for example, be activated by putting the vehicle into reverse gear or by actuating a switch. During the activation of the parking aid, the acoustic signal which indicates to the driver that the parking aid has been successfully activated can be output. Alternatively, the acoustic signal can be a warning sound which indicates a distance from an obstacle, such as another vehicle.

According to another independent aspect of the present disclosure, a vehicle, in particular a motor vehicle, is specified. The vehicle comprises at least part of the system for testing a driving assistance system according to the embodiments of the present disclosure.

In some embodiments, the system can be implemented completely in the vehicle. In particular, all of the essential elements of the system, namely the sensor arrangement and the at least one evaluation module, can be provided in or on the vehicle. This makes it possible to assess the performance of the driving assistance system already from inside the vehicle.

Alternatively, only the sensor arrangement can be provided in or on the vehicle, and the at least one evaluation module can be provided outside the vehicle. For example, the at least one evaluation module can be implemented in a server or a backend. This makes it possible to assess the performance of the driving assistance system from outside the vehicle.

The term "vehicle" encompasses passenger cars, trucks, buses, mobile homes, motorcycles, etc., which are used to transport people, goods, etc. In particular, the term encompasses motor vehicles for transporting people.

Preferably, the vehicle is a dedicated test vehicle. For example, the system can be installed in the vehicle in a non-permanent manner. In other words, the system is not permanently integrated in the vehicle and can be installed in the vehicle only temporarily or in a time-limited manner for the purpose of testing or homologating the driving assistance system.

According to another independent aspect of the present disclosure, a method for testing a driving assistance system is specified. The method comprises detecting an actuation of an operating element of a vehicle by a user and generating corresponding first detection data, wherein the detecting is performed by a sensor arrangement which is able to be attached in the vehicle; detecting an acoustic signal which indicates the actuation of the operating element by the user or is output on the basis of the actuation of the operating element, and generating corresponding second detection data, wherein the detecting is performed by the sensor arrangement; determining a first point in time which corresponds to the actuation of the operating element by the user, on the basis of the first detection data; and determining a second point in time which corresponds to an output of the acoustic signal, on the basis of the second detection data.

The determination of the first point in time and the determination of the second point in time can be carried out in this order. Alternatively, within the scope of the evaluation of the detection data, the second point in time can be determined first and then the first point in time. For example, the acoustic signal can be used as a trigger which initiates the evaluation of the detection data.

The method can implement the aspects of the system for testing a driving assistance system described in this document.

According to another independent aspect of the present disclosure, a software (SW) program is specified. The SW program can be configured to be executed on one or more processors, and to thus carry out the method for testing a driving assistance system described in this document.

According to another independent aspect of the present disclosure, a storage medium is specified. The storage medium can comprise an SW program which is configured to be executed on one or more processors, and to thus carry out the method for testing a driving assistance system described in this document.

According to another independent aspect of the present disclosure, software containing program code for carrying out the method for testing a driving assistance system is to be executed when the software runs on one or more software-controlled devices.

Exemplary embodiments of the disclosure are illustrated in the figures and are described in more detail below.

DETAILED DESCRIPTION OF THE DRAWINGS

Hereinbelow, unless indicated otherwise, the same reference signs are used for identical and identically acting elements.

Figure 1:
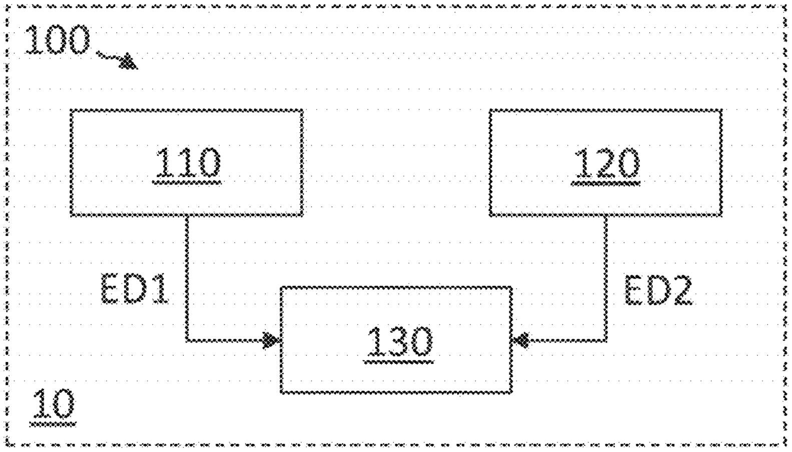
FIG. 1 schematically shows a system for testing a driving assistance system according to embodiments of the present disclosure.

FIG. 1 schematically shows a system 100 for testing a driving assistance system according to embodiments of the present disclosure.

The system 100 comprises a sensor arrangement 110, 120 and at least one evaluation module 130. The sensor arrangement 110, 120 is configured to detect an actuation of an operating element of a vehicle by a user and to generate corresponding first detection data ED1. The sensor arrangement 110, 120 is further configured to detect an acoustic signal which indicates the actuation of the operating element by the user (e.g. to inform a driver about an activation of the driving assistance system) or which is output on the basis of the actuation of the operating element (e.g. as a warning sound which indicates a distance from an obstacle), and to generate corresponding second detection data ED2.

In some embodiments, the sensor arrangement can comprise at least one first sensor module 110 which is configured to detect the actuation of the operating element by the user and to generate the first detection data ED1, and can further comprise at least one second sensor module 120 which is configured to detect the acoustic signal and to generate the second detection data ED2.

The at least one first sensor module 110 can, for example, comprise one or more electronic touch sensors which output a corresponding signal when touched by the user. In addition or alternatively, the at least one second sensor module 120 can comprise one or more microphones which can detect a characteristic acoustic signal which is output during and/or after an activation of the driving assistance system.

The at least one evaluation module 130 is configured to determine, on the basis of the first detection data ED1, a first point in time which corresponds to the actuation of the operating element by the user; and to determine, on the basis of the second detection data ED2, a second point in time which corresponds to an output of the acoustic signal.

The system 100 according to the invention therefore detects, on the one hand, the actuation of the operating element and, on the other hand, an acoustic signal triggered thereby. A timestamp or a point in time is determined for each of these events such that, for example, it is possible to determine in a revision-proof manner whether legally stipulated maximum times between the actuation of the operating element and the acoustic signal are met. In addition, it is not necessary to pick up discrete cabling or bus signals and/or to use proprietary information, such as, e.g., circuit diagrams and/or on-board electrical system topologies.

In some embodiments, the system 100 can be completely implemented in the vehicle 10. In particular, all of the essential elements of the system 110, namely the sensor arrangement 110, 120 and the at least one evaluation module 130, can be provided in or on the vehicle 10. This makes it possible to assess the performance of the driving assistance system already from inside the vehicle 10.

Alternatively, only the sensor arrangement 110, 120 can be provided in or on the vehicle 10, and the at least one evaluation module 130 can be provided outside the vehicle 10. For example, the at least one evaluation module 130 can be implemented in a server or a backend. This makes it possible to assess the performance of the driving assistance system from outside the vehicle 10.

Typically, the vehicle 10 is a dedicated test vehicle. For example, the system 100 can be installed in the vehicle 10 in a non-permanent manner. In other words, the system 100 is not permanently integrated in the vehicle 10 and can be installed in the vehicle 10 only temporarily or in a time-limited manner for the purpose of testing or homologating the driving assistance system.

Figure 2:
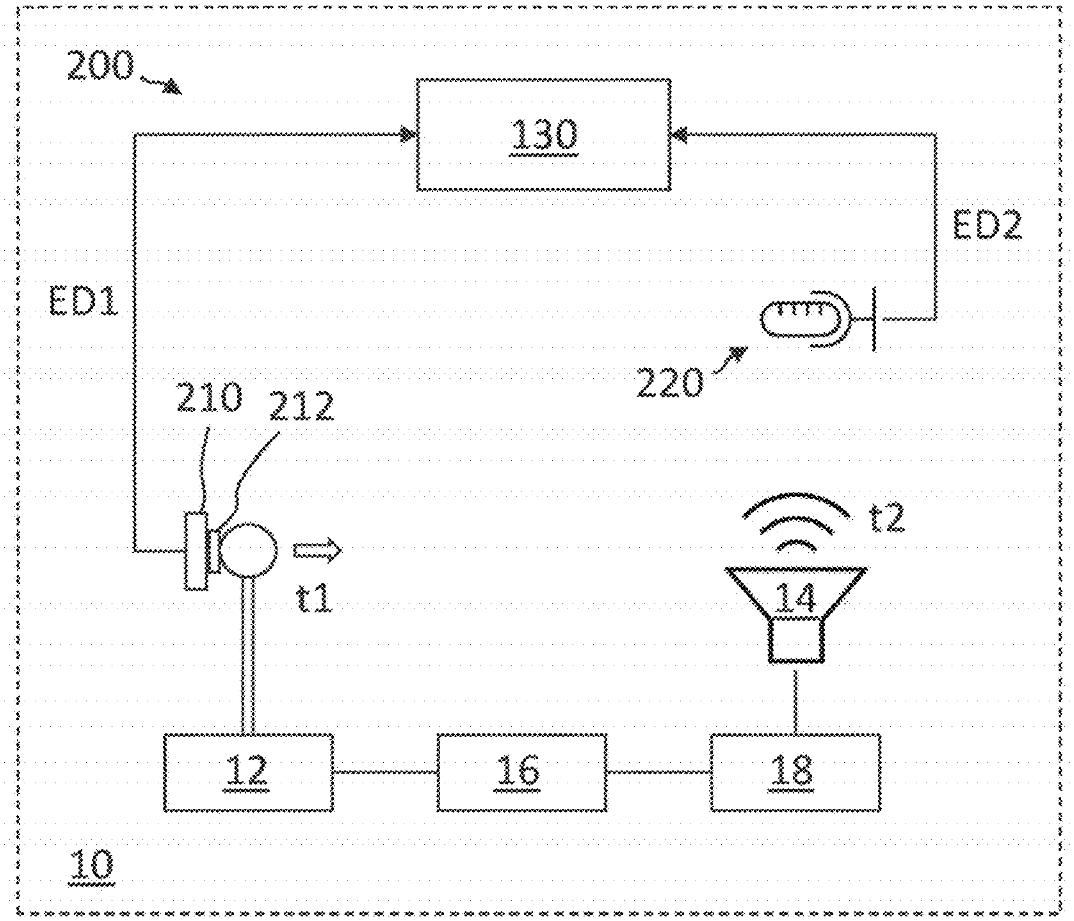
FIG. 2 schematically shows a system for testing a driving assistance system according to further embodiments of the present disclosure.

FIG. 2 schematically shows a system 200 for testing a driving assistance system according to embodiments of the present disclosure.

The system 200 comprises the at least one first sensor module 210, which generates the first detection data ED1, and the at least one second sensor module 220, which generates the second detection data ED2. The at least one first sensor module 210 and the at least one second sensor module 220 can be of a different function type. For example, the at least one first sensor module 210 can comprise one or more touch-sensitive sensor elements, such as one or more electronic touch and/or pressure sensors. The at least one second sensor module 220 can comprise one or more microphones.

The touch-sensitive sensor elements can comprise a tactile sensor and/or a piezo element which reacts to touch and pressure. Alternatively, the touch-sensitive sensor element can comprise or be a touch-sensitive electrical contact surface.

In some embodiments, the at least one first sensor module 210 can only generate the first detection data ED1 and output the latter to the at least one evaluation unit 130 when the touch exceeds a threshold, such as, for example, a force and/or pressure threshold. This makes it possible to prevent a situation in which an actuation of the operating element 12 is falsely detected for example on the basis of a light touch of the user without corresponding activation of the driving assistance system.

The at least one first sensor module 210 can be able to be attached, in particular able to be detachably attached, to the operating element 12 of the vehicle 10. For example, the at least one first sensor module 210 can be detachably attached to the operating element 12 by means of one or more first mounting elements 212. The one or more first mounting elements 212 can, for example, be adhesive films or mechanical clips.

In the example of FIG. 2, the operating element 12 of the vehicle 10 is a gear selector switch. A parking aid can be activated when the vehicle is put into a reverse gear at the point in time t1, and a corresponding acoustic signal can be output via a loudspeaker 14 of the vehicle 10 at the point in time t2. The parking aid can be implemented by a corresponding control device 16. Optionally, provision can additionally be made for an amplifier 18 which is connected between the control device 16 and the loudspeaker 14 in order to output an audible acoustic signal.

The point in time t1 and the point in time t2 can be evaluated, wherein in particular a time difference between putting the vehicle into the reverse gear and the output of the acoustic signal can be determined. For example, it may be legally stipulated that the period of time between the actuation of the operating element 12 at the point in time t1 and the thus initiated output of the acoustic signal at the point in time t2 must be equal to or less than a threshold value. The threshold value can, for example, be 1 second or less, 800 milliseconds or less, or 600 milliseconds or less. In some embodiments, the threshold value can be 600 milliseconds.

In some embodiments, the at least one first sensor module 210 and the at least one second sensor module 220 can each be connected to a channel of a calibrated storage oscilloscope which forms the evaluation unit. For example, a directional microphone which is positioned on the loudspeaker 14 by means of a flexible clamp mounting in the vehicle interior can be connected to a microphone amplifier. In this case, use can optionally also be made of a dummy head for the acoustic measurement. When the gear selector switch 12 is actuated, the touch-sensitive sensor element can be stimulated and an electrical signal can be output to the oscilloscope. Similarly, the acoustic signal can be received by the directional microphone, amplified by a signal amplifier and forwarded to the oscilloscope. As a result, an exact time measurement between action and reaction can be determined and documented by means of corresponding timestamps.

Figure 3:
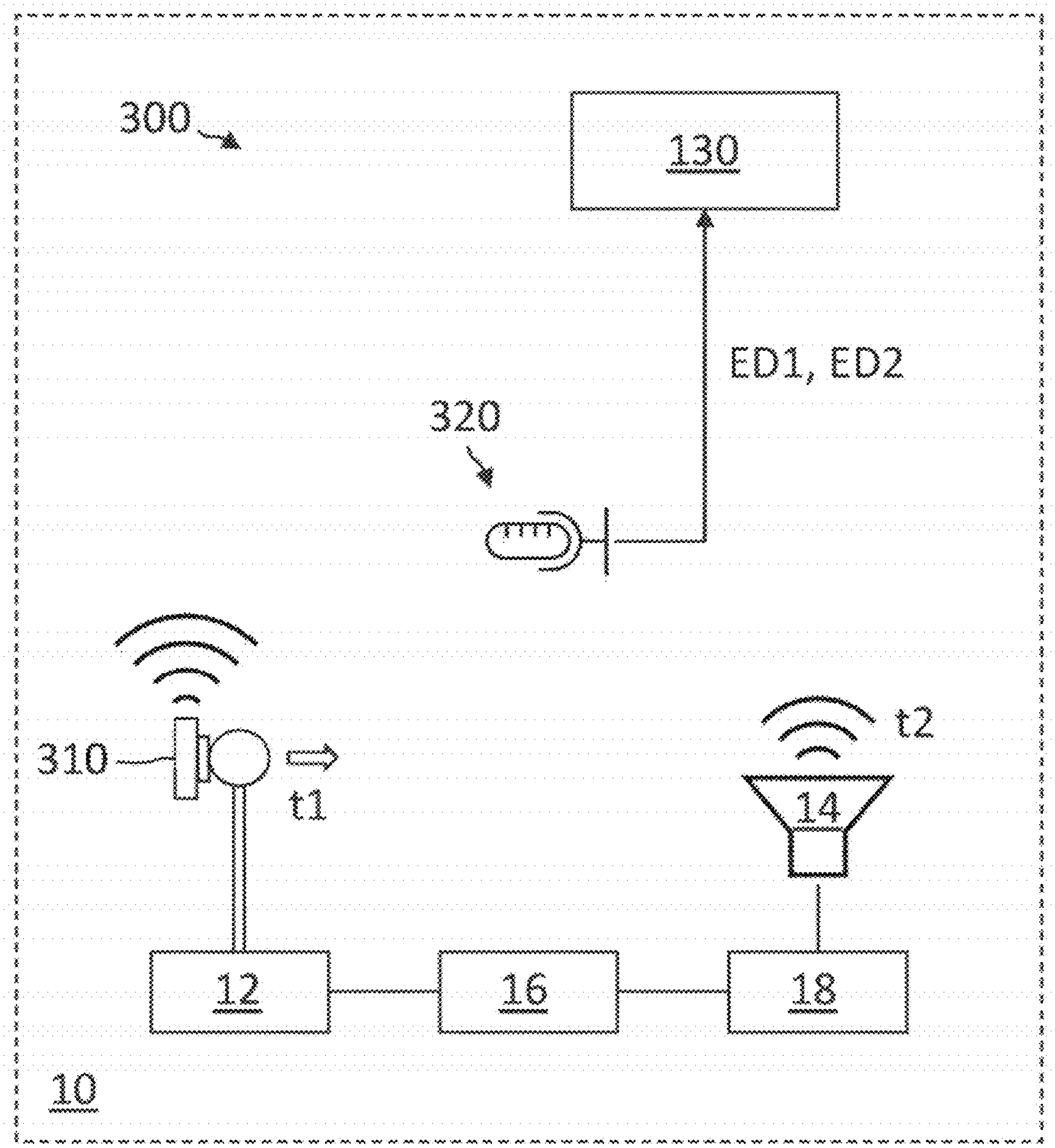
FIG. 3 schematically shows a system for testing a driving assistance system according to further embodiments of the present disclosure.

FIG. 3 schematically shows a system 300 for testing a driving assistance system according to further embodiments of the present disclosure.

The system 300 comprises a sensor module 320 which is configured to detect both the actuation of the operating element 12 by the user at the point in time t1 and the acoustic signal at the point in time t2 and to generate the first detection data ED1 and the second detection data ED2. For example, a single sensor module 320 can be provided to detect both events. In some embodiments, the sensor module 320 can comprise a microphone or be a microphone.

In the example of FIG. 3, the system 300 comprises, instead of the at least one first sensor module, a sound generator 310 on the operating element 12. The sound generator 310 is configured to generate sound when the operating element 12 is actuated by the user, which sound is able to be detected by the sensor module 320, in order to generate the first detection data ED1. In some embodiments, the sound generator 310 can be a mechanical sound generator, such as, for example, a mechanical click-sound generator.

The sound generator 310 can be able to be attached, in particular able to be detachably attached, to the operating element 12 of the vehicle 10. For example, the sound generator 310 can be detachably attached to the operating element 12 by means of one or more mounting elements. The one or more mounting elements can, for example, be adhesive films or mechanical clips.

The use of the sound generator 310 makes it possible to dispense with cabling and a voltage supply. The detected signals can nevertheless be used to determine and document an exact time measurement between action and reaction.

Figure 4:
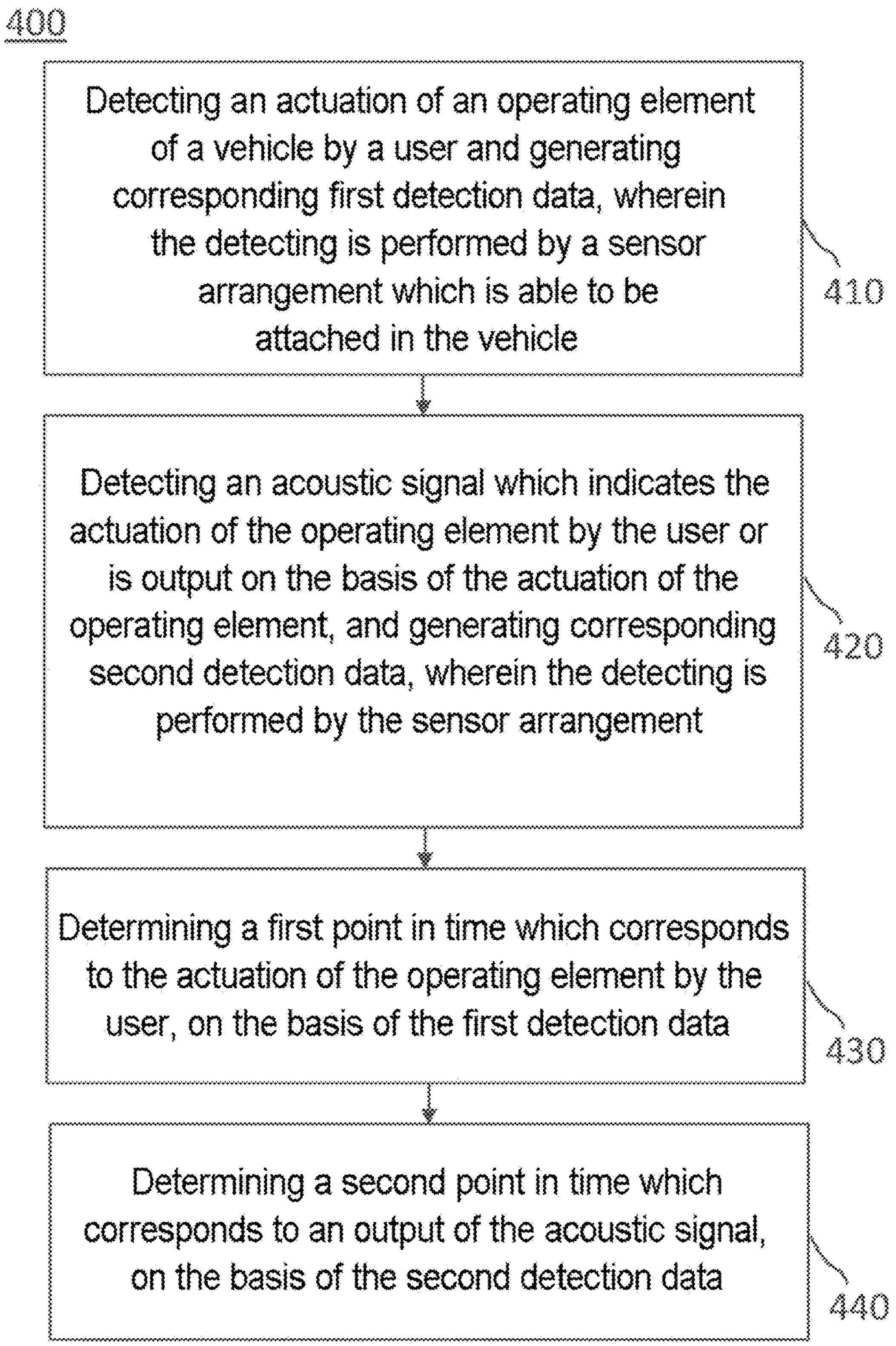
FIG. 4 shows a flowchart of a method for testing a driving assistance system according to embodiments of the present disclosure.

FIG. 4 shows a flowchart of a method 400 for testing a driving assistance system according to embodiments of the present disclosure. The method 400 can be implemented by corresponding software which is able to be executed by one or more processors (e.g. a CPU).

The method 400 comprises, in block 410, detecting an actuation of an operating element of a vehicle by a user and generating corresponding first detection data, wherein the detecting is performed by a sensor arrangement which is able to be attached in the vehicle; in block 420, detecting an acoustic signal which indicates the actuation of the operating element by the user or is output on the basis of the actuation of the operating element, and generating corresponding second detection data, wherein the detecting is performed by the sensor arrangement; in block 430, determining a first point in time which corresponds to the actuation of the operating element by the user, on the basis of the first detection data; and in block 440, determining a second point in time which corresponds to an output of the acoustic signal, on the basis of the second detection data.

The determination of the first point in time in block 430 and the determination of the second point in time in block 440 can be carried out in this order. Alternatively, within the scope of the evaluation of the detection data, the second point in time according to block 440 can be determined first and then the first point in time according to block 430. For example, the acoustic signal can be used as a trigger which initiates the evaluation of the detection data.

According to the invention, the sensor arrangement, which is able to be installed in the vehicle, detects two events: firstly, the actuation of the operating element (e.g. a haptic and/or acoustic trigger on the gear selector switch or an activation element for the driving assistance system) and secondly, an acoustic signal triggered thereby (e.g. an audio output of a loudspeaker), wherein a timestamp is determined for each of the events. The corresponding timestamps can be used to determine whether, e.g., legally stipulated maximum times between actuation of the operating element and the acoustic signal are met. As a result, it is possible to draw conclusions about performance of the driving assistance system, such as a parking aid, for example for homologation thereof. In addition, for the homologation, it is not necessary to pick up discrete cabling or bus signals and/or to use proprietary information, such as, e.g., circuit diagrams and/or on-board electrical system topologies.

Although the invention has been explained and illustrated more thoroughly in detail by way of preferred exemplary embodiments, the invention is not restricted by the examples disclosed, and other variations can be derived therefrom by a person skilled in the art without departing from the scope of protection of the invention. It is therefore clear that a large number of variation possibilities exist. It is likewise clear that embodiments mentioned by way of example actually only constitute examples which are in no way to be regarded as a limitation of, for instance, the scope of protection, the application possibilities or the configuration of the invention. Rather, the preceding description and the description of the figures enable a person skilled in the art to implement the exemplary embodiments in a concrete way, wherein the person skilled in the art, with knowledge of the concept of the invention disclosed, can make diverse changes for example with regard to the function or the arrangement of individual elements mentioned in an exemplary embodiment, without departing from the scope of protection defined by the claims and the legal counterparts thereof, such as, for instance, more extensive explanations in the description.

The invention claimed is:

1. A system for testing a driving assistance system, comprising:
- a sensor arrangement configured to:
  - detect an actuation of an operating element of a vehicle by a user and generate corresponding first detection data, and
  - detect an acoustic signal which indicates the actuation of the operating element by the user or which is output on the basis of the actuation of the operating element and generate corresponding second detection data; and
- at least one evaluation module configured to:
  - determine, on the basis of the first detection data, a first point in time corresponding to the actuation of the operating element by the user, and
  - determine, on the basis of the second detection data, a second point in time corresponding to an output of the acoustic signal,
- wherein the operating element of the vehicle is a gear selector switch or a switching element for activating the driving assistance system.

2. The system of claim 1, wherein the at least one evaluation module is configured to determine a difference between the second point in time and the first point in time.

3. The system of claim 1, wherein the sensor arrangement comprises:
- at least one first sensor module configured to: detect the actuation of the operating element by the user, and generate the first detection data;
- at least one second sensor module configured to: detect the acoustic signal indicating the actuation of the operating element by the user, and generate the second detection data.

4. The system of claim 3, wherein:
- the at least one first sensor module and the at least one second sensor module are of a different function type; and/or
- the at least one first sensor module comprises one or more electronic touch sensors; and/or
- the at least one second sensor module comprises one or more microphones.

5. The system of claim 3, wherein the at least one first sensor module is detachably attachable to the operating element of the vehicle.

6. The system of claim 1, wherein the sensor arrangement comprises:
- a microphone configured to: detect both the actuation of the operating element by the user and the acoustic signal, and generate the first detection data and the second detection data.

7. The system of claim 6, further comprising a mechanical sound generator attachable to the operating element of the vehicle, wherein the sound generator is configured to generate sound when the operating element is actuated by the user, which sound is detectable by the microphone, in order to generate the first detection data.

8. A method for testing a driving assistance system, comprising:
- detecting an actuation of an operating element of a vehicle by a user, wherein the detecting is performed by a sensor arrangement which is able to be attached in the vehicle, and wherein the operating element of the vehicle is a gear selector switch or a switching element for activating the driving assistance system;
- generating first detection data corresponding to detecting the actuation;
- detecting an acoustic signal indicating the actuation of the operating element by the use, wherein the detecting is performed by the sensor arrangement;
- generating second detection data corresponding to detecting the acoustic signal;
- determining, based on the first detection data, a first point in time corresponding to the actuation of the operating element by the user; and
- determining, based on the second detection data, a second point in time corresponding to an output of the acoustic signal.

9. A non-transitory storage medium storing a software program executable on one or more processors to carry out the method of claim 8.

* * * * *